(12) United States Patent  
Hino

(10) Patent No.: US 10,281,665 B2  
(45) Date of Patent: May 7, 2019

(54) OPTICAL TRANSCEIVER

(71) Applicant: SUMITOMO ELECTRIC DEVICE INNOVATIONS, INC., Yokohama (JP)

(72) Inventor: Masato Hino, Yokohama (JP)

(73) Assignee: Sumitomo Electric Device Innovations, Inc., Yokohama (JP)

( * ) Notice: Subject to any disclaimer, the term of this patent is extended or adjusted under 35 U.S.C. 154(b) by 0 days.

(21) Appl. No.: 15/628,281

(22) Filed: Jun. 20, 2017

(65) Prior Publication Data

US 2017/0363820 A1 Dec. 21, 2017

(30) Foreign Application Priority Data

Jun. 21, 2016 (JP) .................................. 2016-122902

(51) Int. Cl.
*G02B 6/42* (2006.01)
*G02B 6/38* (2006.01)
*H01R 13/6581* (2011.01)

(52) U.S. Cl.
CPC ......... *G02B 6/4256* (2013.01); *G02B 6/3817* (2013.01); *G02B 6/4201* (2013.01); *G02B 6/424* (2013.01); *G02B 6/4246* (2013.01); *G02B 6/4257* (2013.01); *G02B 6/4277* (2013.01); *G02B 6/4284* (2013.01); *G02B 6/4293* (2013.01); *H01R 13/6581* (2013.01)

(58) Field of Classification Search
None
See application file for complete search history.

(56) References Cited

U.S. PATENT DOCUMENTS

| | | | | |
|---|---|---|---|---|
| 5,757,998 A | * | 5/1998 | Thatcher | G02B 6/4201 385/75 |
| 6,164,838 A | * | 12/2000 | Maehara | G02B 6/4246 361/749 |
| 7,559,704 B2 | | 7/2009 | Togami et al. | |
| 2011/0222822 A1 | * | 9/2011 | Yoshikawa | G02B 6/4246 385/92 |
| 2014/0205248 A1 | * | 7/2014 | Yamada | G02B 6/4246 385/92 |

* cited by examiner

*Primary Examiner* — Michael Stahl
(74) *Attorney, Agent, or Firm* — Baker Botts L.L.P.; Michael A. Sartori

(57) ABSTRACT

An optical transceiver that includes a housing, an inner ceiling, and an outer ceiling. The housing includes sides and a bottom. The inner ceiling is assembled with the housing; while, the outer ceiling is fit with the housing. The outer ceiling, which forms a cavity accompanied with the housing, is fastened with the inner ceiling by a screw inserted into a screw hole.

15 Claims, 14 Drawing Sheets

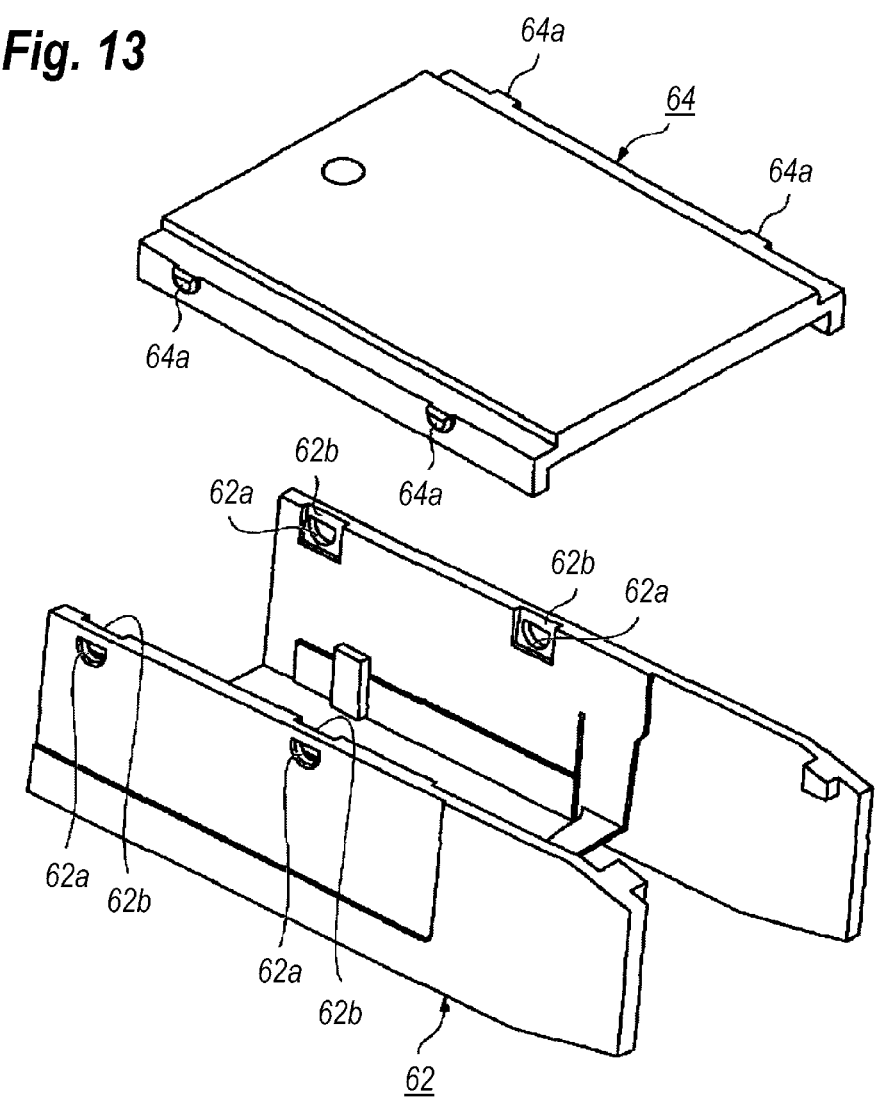

OPTICAL TRANSCEIVER

CROSS REFERENCE TO RELATED APPLICATION

This application is based upon and claims the benefit of priority from prior Japanese Patent Application No. 2016-122902, filed Jun. 21, 2016, the entire contents of which are incorporated herein by reference.

BACKGROUND OF THE INVENTION

1. Field of the Invention

The present invention relates to an optical transceiver.

2. Background Arts

A prior patent document of U.S. Pat. No. 7,559,704 has disclosed an optical transceiver that implements optical sub-assemblies. The optical transceiver disclosed therein further provides an elastic member with a plane shape of a U-character, which is comprised of a primary portion and arms each extending from respective ends of the primary portion. The optical transceiver further provides a housing and a circuit board that is installed therein, where the circuit board is assembled with the housing by screws fastened to screw holes of the housing.

In order to securely assemble a ceiling with the housing, two or more screws are preferably necessary. However, multi-source agreements (MSAs), which have been defined and accepted in a field of the optical communication system and vendors supplying components for the system, severely specify outer dimension of an optical transceiver. Also, the MSAs requests superior performance and complex functions, which could be realized by a lot of electrical and optical components to be installed within the optical transceiver. Accordingly, it has been complex and hard to realize such performance and functions within limited sizes of an optical transceiver.

SUMMARY OF THE INVENTION

An aspect of the present invention relates to an optical transceiver that encloses optical and electrical components within a cavity formed by a housing and an outer ceiling that is tightly and reliable screwed with the housing. The optical transceiver of the invention comprises the housing, the outer ceiling, and an inner ceiling. The housing includes a bottom and sides each rising from respective edges of the bottom. The housing forms a cavity that encloses optical and electrical components therein. The outer ceiling is secured with the sides of the housing. The outer ceiling also forms the cavity accompanied with the housing. The inner ceiling, which is provided inside of the outer ceiling, is fit in the housing. A feature of the optical transceiver of the invention is that the outer ceiling is fixed to the inner ceiling by a screw.

BRIEF DESCRIPTION OF THE DRAWINGS

The invention will now be described by way of example only with reference to the accompanying drawings in which:

FIG. 13 shows an inner ceiling and a housing according to the fourth embodiment of the present invention.

DESCRIPTION OF EMBODIMENT

Next, an embodiment of the present invention will be described as referring to accompanying drawings. In the description of the drawings, numerals or symbols same with or similar to each other fill refer to elements same with or similar to each other without duplicating explanations.

First Embodiment

Figure 1:
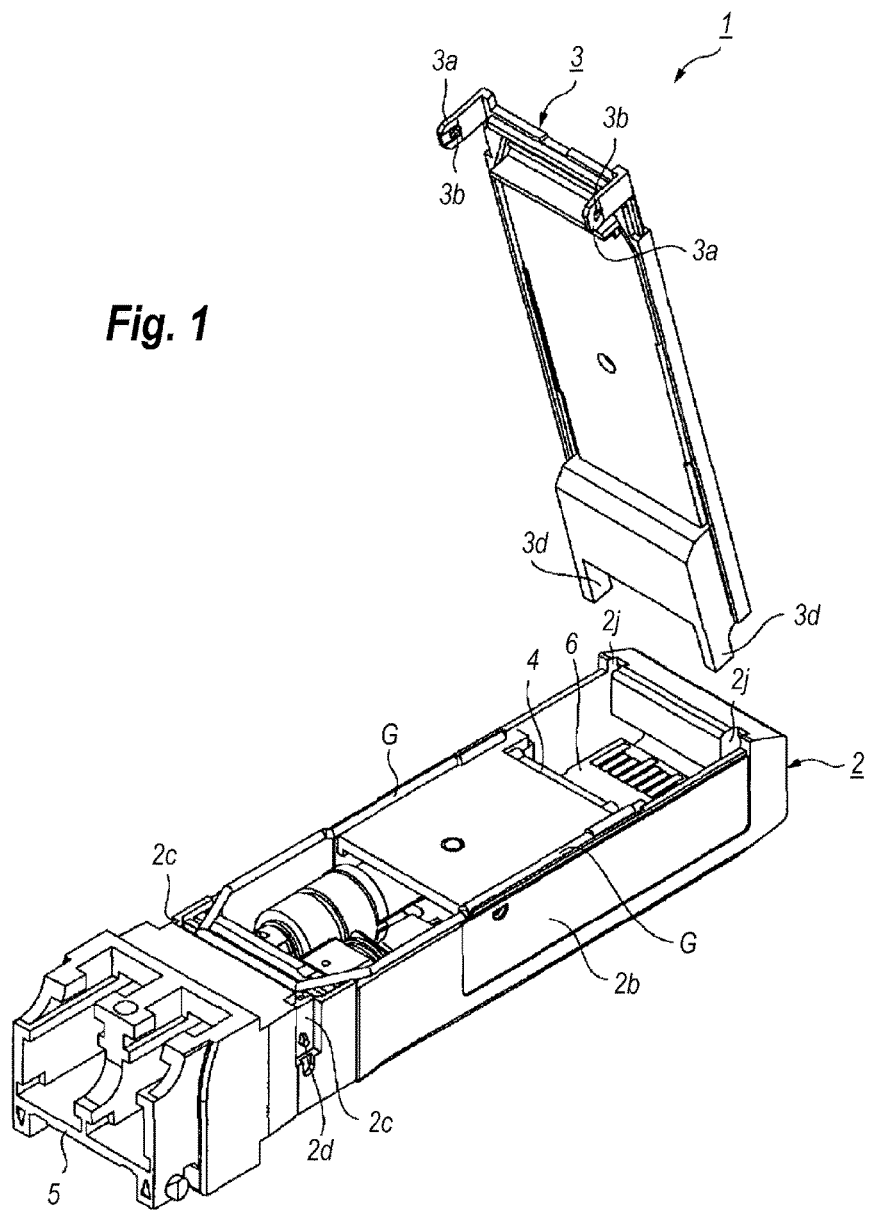
FIG. 1 is a perspective view showing an inside of an optical transceiver according to the first embodiment of the present invention.

FIG. 1 is a perspective view showing an inside of an optical transceiver according to the first embodiment of the present invention. The optical transceiver 1, which is to be used in the optical communication system, may transduce between electrical signals and optical signals. The optical transceiver 1 is to be inserted along a longitudinal direction thereof into a cage, which is prepared in the host system, such that an electrical plug 6a provided in a rear end of the optical transceiver mates with an electrical receptacle set in a deep end of the cage. Thus, an electrical communication against the host system may be established. The optical transceiver 1 provides a housing 2, an outer ceiling 3, an inner ceiling 4, an optical receptacle 5, and a circuit board 6.

Figure 2:
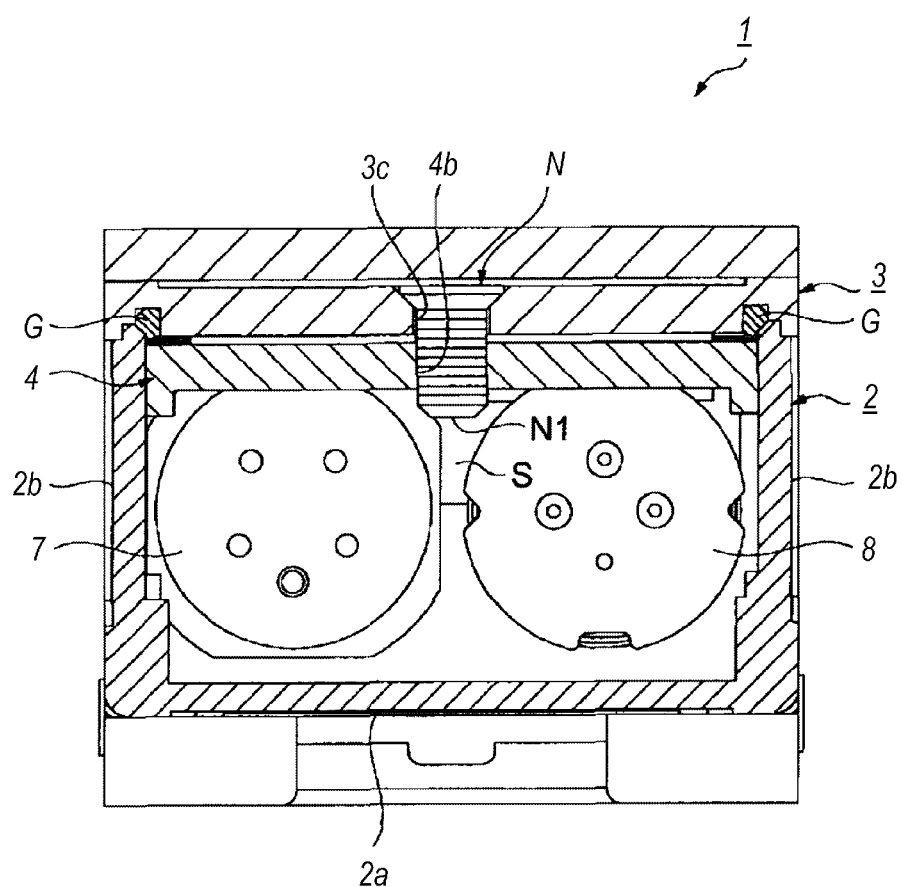
FIG. 2 shows a cross section of a mechanics to securely assembly the optical transceiver by a screw.

FIG. 2 shows a cross section of a mechanics to securely assembly the optical transceiver by a screw. The housing 2 encloses optical and electrical components therein. As shown in FIGS. 1 and 2, the housing 2 includes a bottom 2a, and two sides 2b built in respective ends of the bottom 2a. The housing 2 also provides the optical receptacle 5 in the front end thereof, where the optical receptacle 5 receives an external optical connector therein. The description below assumes that a direction where the optical receptacle 5 is provided is regarded as "forward" or "front", while another direction where the electrical plug 6a is provided is regarded as "rear" or "back"; but those assumptions could bring no influence for the claim construction. The housing 2 provides, in the rear of the optical receptacle 5 and outer surfaces of the sides 2b, pockets 2c within which projections 2d that assemble the outer ceiling 3 with the housing 2 are provided. The sides 2b in the rear ends thereof provide grooves 2j that receive the rear ends of the outer ceiling 3.

The outer ceiling 3 and the inner ceiling 4 have a rectangular plane shape. The outer ceiling 3 provides, in respective sides of the front thereof, legs 3a protruding downward and including holes 3b engaged with the projections 2d in the pocket 2c of the housing 2. The outer ceiling 3 also provides in the rear end thereof other projections 3d protruding rearward and set within the grooves 2j of the housing.

The housing 2, exactly the bottom 2a and the sides 2b, and the outer ceiling 3 form a cavity S that encloses the electrical and optical components therein. The bottom 2a, the sides, 2b, and the outer and inner ceilings, 3 and 4, may shield the cavity S to prevent electro-magnetic interference (EMI) noises from penetrating into and leaking out from the cavity. A gasket G is put between the sides 2b and the outer ceiling 3 so as to securely shield the cavity S.

The inner ceiling 4, which may be made of resin and/or metal, may secure a path for dissipating heat generated in the electronic components mounted on the circuit board to the outer ceiling 3. When the outer ceiling 3 is made of metal, the heat dissipation becomes considerably efficient. The inner ceiling 4 provides a screw hole 4b in a center thereof, while, the outer ceiling 3 provides also in a center thereof a hole 3c through which a screw N passes, where the hole 3c aligns with the screw hole 4b. Fastening the screw N inserted from the hole 3c of the outer ceiling 3 with the screw hole 4b of the inner ceiling 4, the outer ceiling 3 may be securely assembled with the inner ceiling 4, and the outer and inner ceilings, 3 and 4, may be assembled with the housing 2. The screw N has a length that a tip N1 thereof is apart from the electronic components on the circuit board 6.

Figure 3:
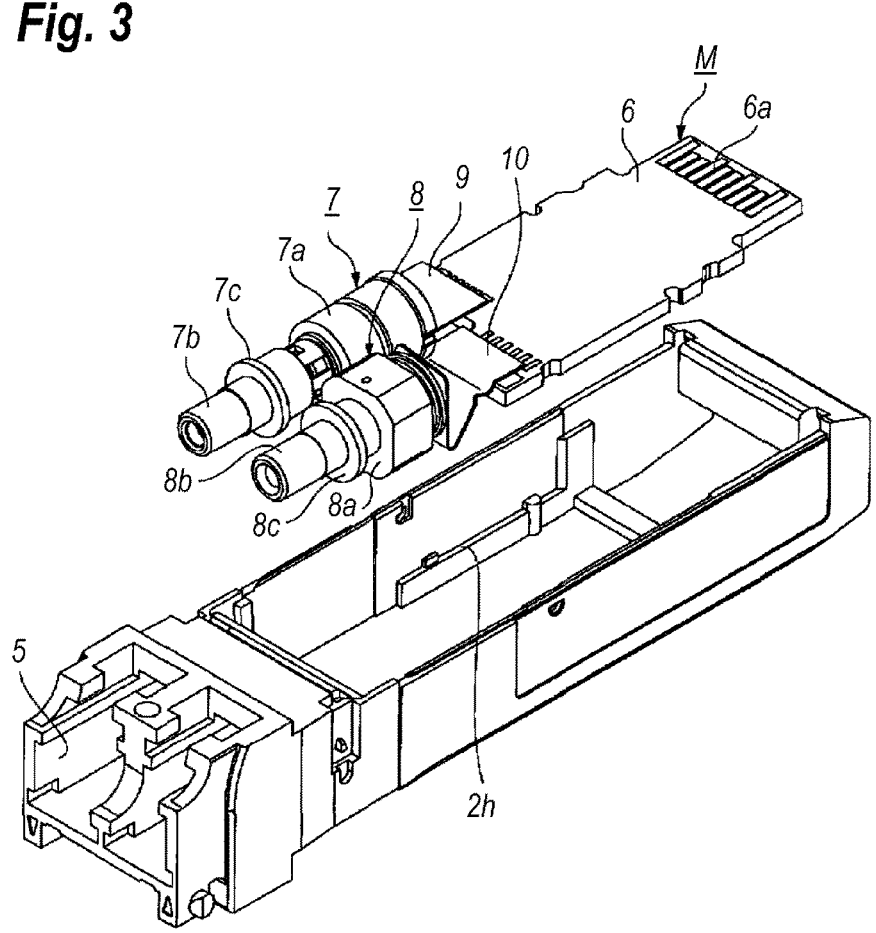
FIG. 3 is a perspective view showing a process for installing an intermediate assembly within housing.

FIG. 3 is a perspective view showing the circuit board 6 and optical components installed within the optical transceiver 1. The cavity S installs, in addition to the circuit board 6, a transmitter optical sub-assembly (TOSA) 7, a receiver optical sub-assembly (ROSA) 8, and two flexible printed circuit (FPC) boards, 9 and 10. Those components of the circuit board 5, the TOSA 7, the ROSA 8, and two FPC boards, 9 and 10, form an intermediate assembly M. As FIG. 3 illustrates, the TOSA 7 and the ROSA 8 are arrange in side by side with respect to the longitudinal direction of the optical transceiver 1. The FPC board 9 connects the TOSA 7 to the circuit board 6, while, the other FPC board 10 connects the ROSA 8 to the circuit board 6.

The ROSA 8 may convert an optical signal coming from an outside of the optical transceiver 8 into an electrical signal that is sent to the circuit board 6 through the FPC board 10. A circuit implemented on the circuit board 6 may amplify this electrical signal and outputs to the host system through the electrical plug 6a. On the other hand, another electrical signal provided from the host system through the electrical plug 6a enters another circuit also mounted on the circuit board 6. This circuit processes thus transmitted electrical signal and outputs to the TOSA 7 through the FPC board 9. The TOSA 7 may convert this electrical signal into another optical signal and externally outputs through the optical receptacle 5.

The TOSA 7 includes a body 7a, a sleeve 7b protruding from the bod 7a, and a flange that is a portion of the sleeve 7b. The ROSA 8 also includes a body 8a, a sleeve 8b, and a flange 8c. Respective tip ends of the sleeves, 7b and 8b, extrude within the optical receptacle 5 and optically couple with the external optical connector mated with optical receptacle 5. The flanges, 7c and 8c, may determine respective positions of the TOSA 7 and the ROSA 8 in the housing 2.

Figure 4:
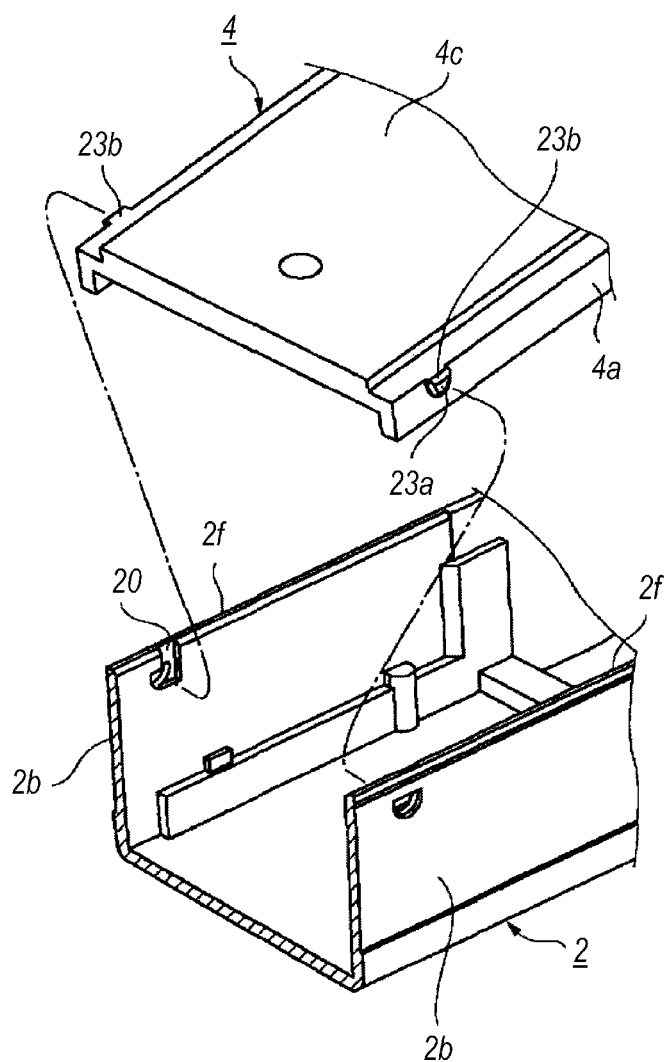
FIG. 4 is a perspective view of a mechanics for assembling an inner ceiling with the housing.
Figure 5:
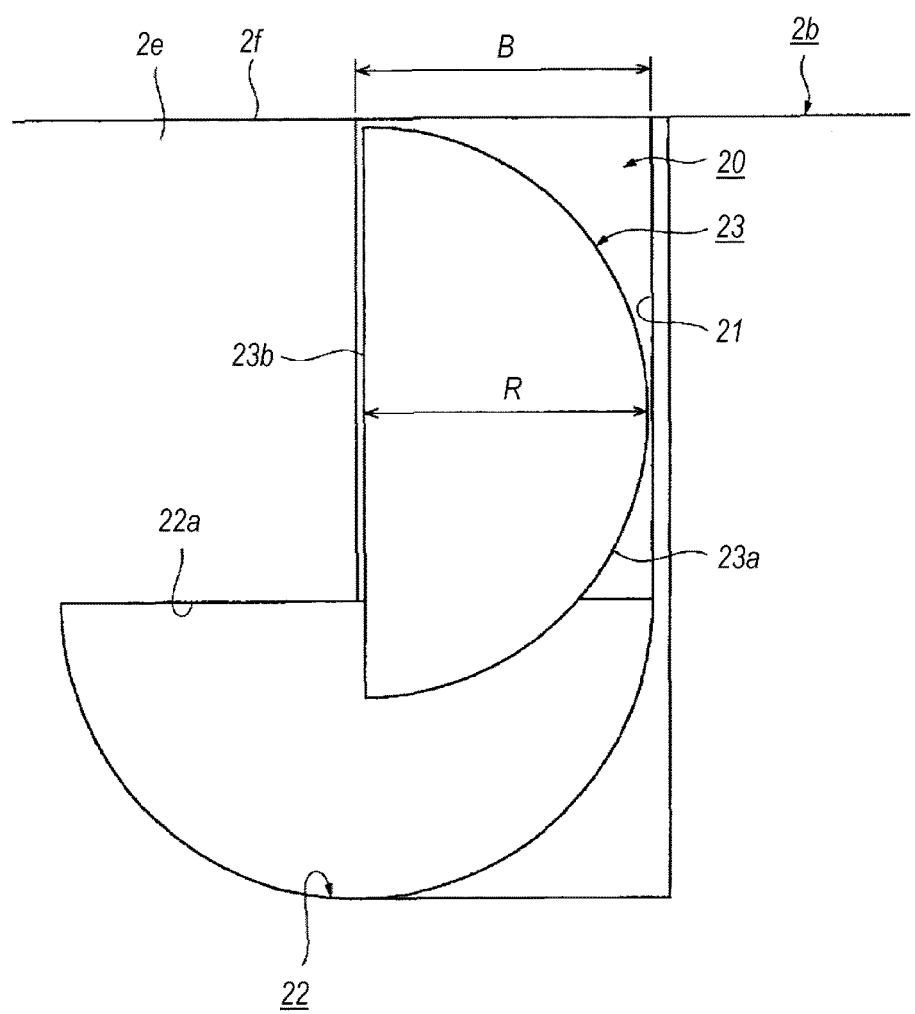
FIG. 5 is a side view that magnifies a groove and a projection appearing in FIG. 4.

FIG. 4 is a perspective view showing a mechanism by which the inner ceiling 4 is secured with the housing 2. The housing 2 provides grooves 20 in respective inner surfaces of the sides 2b. The grooves 20 are formed in symmetrical positions with respect to the longitudinal axis of the optical transceiver 1. FIG. 5 magnifies the groove 20. The groove 20 has a first part 21 and a second part 22 that form a plane shape of an L-character, where the first part 21 corresponds to a vertical bar of the L-character and extends from the top 2f of the side 2b, while, the second part 22 corresponds to a horizontal bar of the L-character. The second part 22 provides an upper wall 22a extending parallel to the top 2f. The first part 21 do not pierce the side 2b but the second part 22 pierces the side 2b by an opening with a semicircular cross section.

Referring back to FIG. 4, the inner ceiling 4 provides sides 4a with projections 23 with a semicircular cross section in front ends of the respective sides 4a. The projections 23 have top flat surfaces 23b parallel to the primary surface 4c of the inner ceiling 4; while, bottom arched surfaces 23a with cross sections substantially fit with the cross section of the opening in the second part 22 of the groove 20. Also, the first part 21 has a width B that is greater than a radius R of the projection 23 but smaller than a diameter of the arched surface 23a. Accordingly, the projection 23 may be fit with the groove 20 by inserting from the top 2f of the side 2b to a deep end of the first part 21 as facing the arched surface 23a rearward, then rotating the arched surface 23a as tracing the second part 22. Finally, the projection 23 is set within the opening in the second part 22 of the groove 20. Setting the projection 23 within the second part 22; the arched surface 23a of the projection 23 faces downward.

Figure 6:
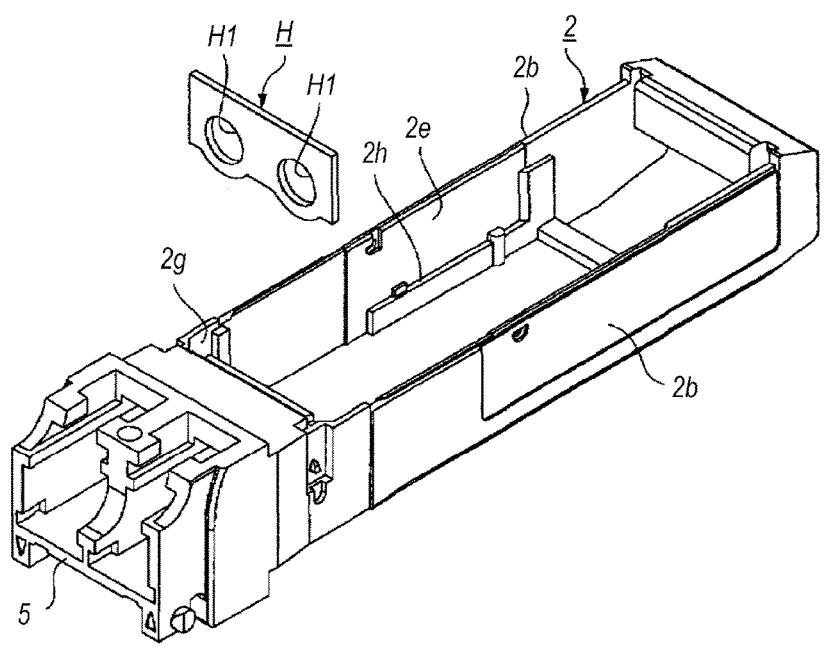
FIG. 6 is a perspective view showing a process for inserting a sheet into the housing.

Next, procedures for assembling the optical transceiver 1 will be described. FIG. 6 is a perspective view showing a process of installing a sheet H into the housing 2. First, the process inserts the sheet H into grooves 2b prepared in the inner surfaces of the sides 2b. The sheet H may be an electrically conductive rubber and provide two holes H1 each corresponding to the sleeves, 7b and 8b, of the TOSA 7 and the ROSA 8.

Independent of the installation of the sheet H, the process may prepare the intermediate assembly M in the outside of the housing 2. Specifically, circuit elements and components are mounted on the circuit board 6 by soldering. Concurrently with the mount of the circuit elements and the components, the process may perform the optical alignment of the TOSA 7 and the ROSA 8, specifically, the sleeves, 7b and 8b, exactly, optical fibers set in the sleeves, 7b and 8b, are optical aligned with optical devices such as a laser diode (LD) and a photodiode (PD) installed within the respective bodies, 7a and 8a. Finally, thus optically aligned TOSA and ROSA are connected with the circuit board 6 through the FPC boards, 9 and 10. Then, the process installs the circuit board 6 and the intermediate assembly M within the housing 2 as inserting the sleeves, 7b and 8b, into the holes H1 in the sheet H. The circuit board 6 is set on steps 2h prepared in the inner surfaces of the sides 2b.

Figure 7:
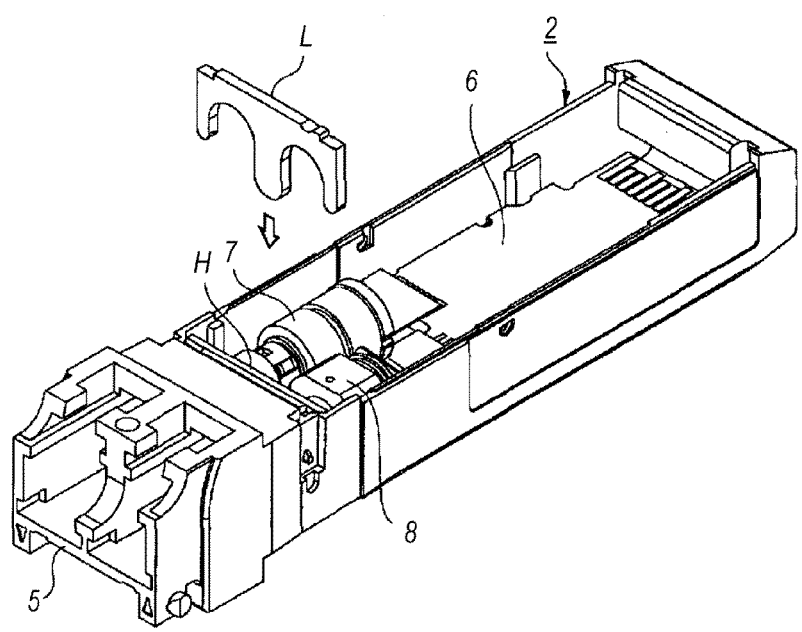
FIG. 7 is a perspective view showing a process for inserting a holder into the housing.

Then, a holder L, which may be made of stainless steel of SUS304 and/or SUS301, fixes the sleeves, 7b and 8b, of the TOSA 7 and the ROSA 8 against the housing 2, as FIG. 7 illustrates. The holder L, which is set in a rear of the flanges, 7c and 8c, pushes the flanges, 7c and 8c, against the rear wall of the optical receptacle 5, thus, the TOSA 7 and the ROSA 8 may be fixed in the respective positions against the housing 2.

Figure 8:
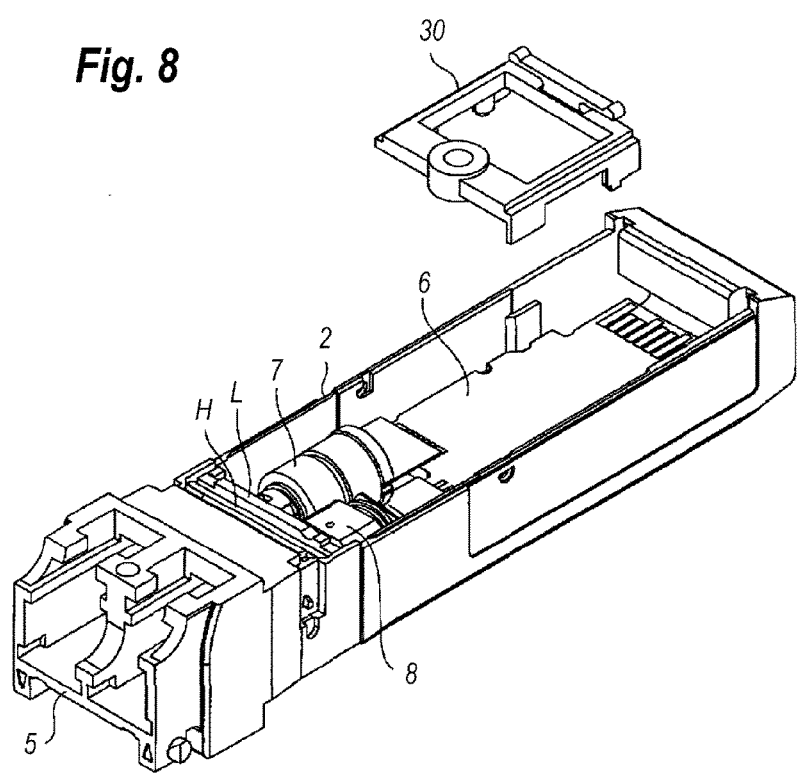
FIG. 8 is a perspective view showing a process for inserting a spacer into the housing.
Figure 9:
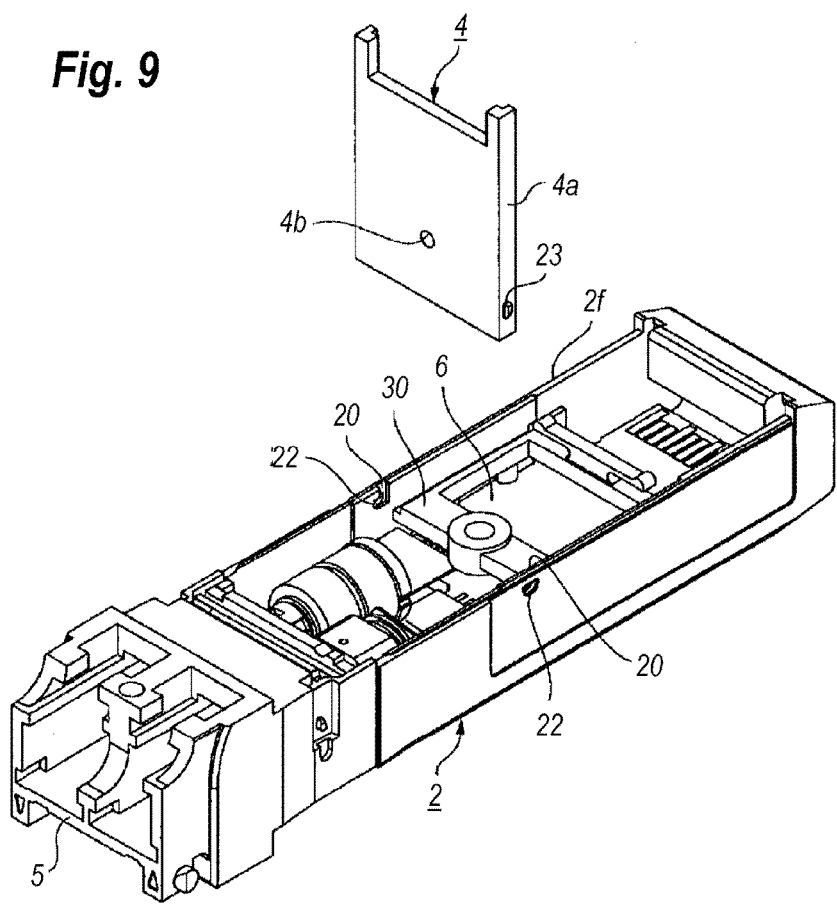
FIG. 9 is a perspective view showing a process for installing the inner ceiling into the housing.

Then, as FIG. 8 indicates, the process sets a spacer 30 onto the circuit board 6. The spacer 30, which may be made of resin, inherently has elasticity. Accordingly, setting the spacer 30 between the inner ceiling 5 and the circuit board 6, the inner ceiling 4 pushes the circuit board 6 downward when the inner ceiling 4 is assembled with the housing 2, which pushes the circuit board 6 against the step 2*h*. Thus, the circuit board 6 is securely fixed in the positon thereof within the housing 2. The spacer 30 also prevents the circuit components mounted on the circuit board 6 from causing short circuits against the inner ceiling 4.

Then, the inner ceiling 4 is assembled with the housing 2. Applying thermal grease between the circuit element on the circuit board 6 and the inner ceiling 4, inserting the projection 23 into the grooves 20 as facing the arched surface 23*a* rearward to the deep ends of the first parts 21, and rotating the inner ceiling 4 with the projection 23 as the center of the rotation as fixing the projection 23 at the second part 22 of the groove 20 until the arched surface 23 faces downward, and mating the projection 23 with the opening in the second part 22, the inner ceiling 4 is securely assembled with the housing 2 above the spacer 30.

Figure 10:
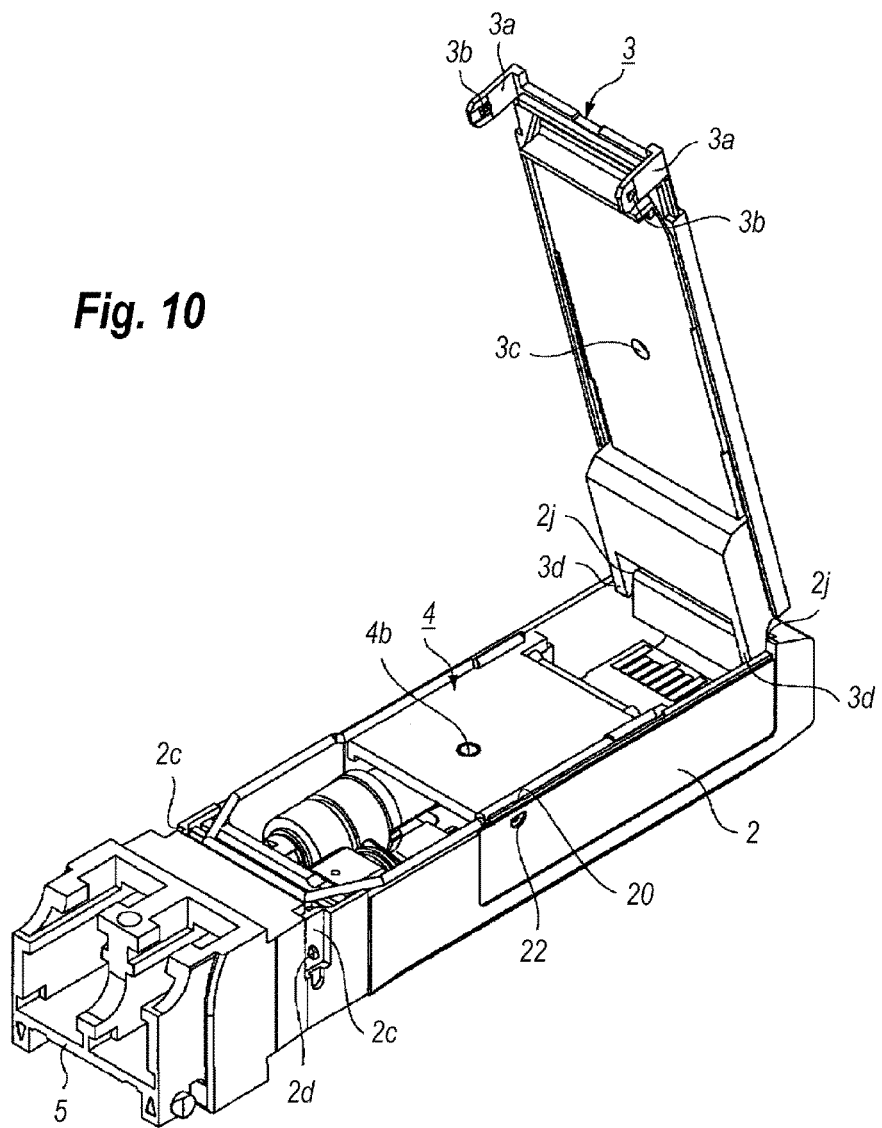
FIG. 10 is a perspective view showing a process for assembling an outer ceiling with the housing.

Then, as FIG. 10 illustrates, the process assembles the outer ceiling 5 with the housing 2. Specifically, inserting the projections 3*d* in the rear ends thereof into the grooves 2*j* in the rear ends of the sides 2*b* of the housing 2, the outer ceiling 3 may be securely supported by the sides 2*b*. Rotating the outer ceiling 3 frontward by the projections 3*d* as the center of the rotation, the outer ceiling 3 is set above the inner ceiling 4. Mating the projections 2*d* in the pockets 2*c* of the housing 2 with the holes 3*b* in the legs 3*a* of the front end of the outer ceiling 3, the outer ceiling 3 is assembled with the housing 2. Thereafter, a screw N may fix the outer ceiling 3 with the inner ceiling 4 by inserting through the opening 3*c* in the outer ceiling 3, and screwing in the screw hole 4*b* in the inner ceiling 4. Thus, the outer ceiling 3 is tightly and securely fixed with the inner ceiling 3, and the process of assembling the optical transceiver 1 is completed.

Next, preferable subjects of the present optical transceiver 1 will be described. The optical transceiver 1 includes the outer and inner ceilings, 3 and 4, where the inner ceiling 4 provides the projections 23 in the sides 4*a* thereof facing the sides 2*b* of the housing 2. On the other hands, the sides 2*b* provide the grooves 20 that receive the projections 23. The outer ceiling 3 is assembled with the inner ceiling 4 by the screw N. Thus, the optical transceiver 1 provides the dual ceilings, 3 and 4, screwed to each other, which may securely seal the cavity S.

The inner ceiling 4 may rotate by the projections 23 in the front thereof as the center of the rotation; while, the outer ceiling 3 may also rotate by the projections 3*d* in the rear thereof as the center of the rotation. Moreover, the screw N may fasten the outer ceiling 3 with the inner ceiling 4 at the position between the projections, 23 and 3*d*. Thus, not only the outer ceiling 3 is fixed to the inner ceiling 4, but the ceilings, 3 and 4, are tightly fixed to the housing 2.

That is, when the outer ceiling 3 is rotated by the rear end thereof as the center of the rotation and the inner ceiling 4 is also rotated by the rear end thereof as the center of the rotation, it could be hard to prevent the front end of the ceilings, 3 and 4, from jouncing because of a lengthened dimension from the rear end, which is the center of the rotation, to the front end. On the other hand, the optical transceiver 1 of the embodiment rotates the outer ceiling 3 by the rear end as the center of the rotation but the inner ceiling 4 by the front end as the center of the rotation, which may bind both ends of the composite ceiling and remove the rotational freedom. Thus, the ceilings, 3 and 4, may be tightly fixed to the housing 2, and prevent the ceilings, 3 and 4, from jouncing after they are assembled with the housing 2.

The housing 2 provides the L-shaped grooves 20 in the sides 2*b*, while, the inner ceiling 4 provides the projections 23 with the semicircular shape. The groove 20 in the first part 21 thereof extends from the top 2*f* of the sides 2*b* of the housing 2 and provides the second part 22 with the semicircular shape in the deep end of the first part 21. The inner ceiling 4 is assembled with the housing 2 by inserting the projection 23 into the first part 21 of the groove 20 as the arched portion 23*a* of the projection 23 faces rearward, rotating as the arched surface 23*a* traces the arched outer surface of the second part when the projection 23 reaches the deep end of the first part 21, and is set in the semicircular opening of the second part 22. Because the projection 23 has the plane shape fit with the shape of the opening in the second part 22, the inner ceiling 4, or the projection 23, may smoothly rotate. The groove 20 has a width B slightly wider than a radius R of the projection 23 but slightly smaller than the diameter of the projection 23, the projection 23 may be inserted within the groove 20 as the inner ceiling 4 is held up and down without any problems.

Second Embodiment

Figure 11:
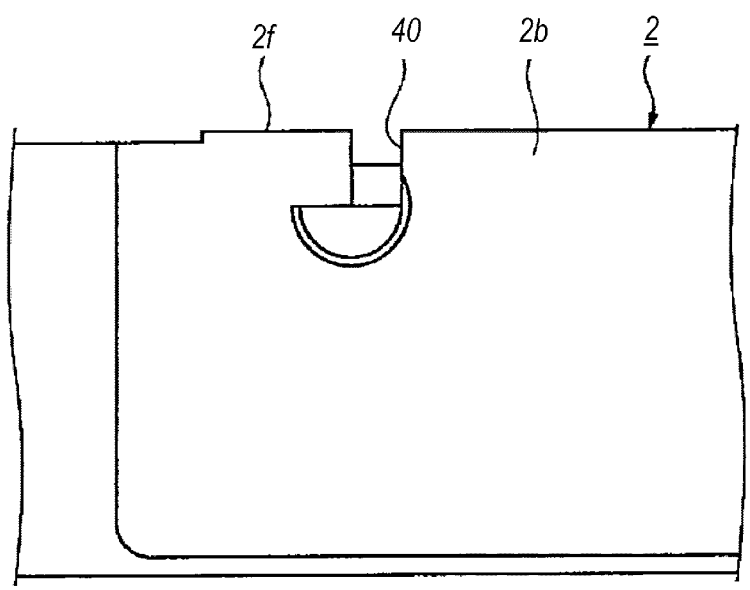
FIG. 11 is a side view of a groove according to the second embodiment of the present invention.

Next, an optical transceiver according to the second embodiment of the present application will be described. The optical transceiver of the second embodiment, as FIG. 11 indicates, has features of the groove 40 and the projection set within the groove 40 whose shapes are different from the shapes of the groove 20 and the projection 23 of the first embodiment. The description below concentrates on subjects different from those of the first embodiment and will omit those substantially same with the first embodiment. The groove 40 in a whole thereof pierces the sides 2*b* of the housing. Also, the projection of the second embodiment largely protrudes from the side of the inner ceiling 4 compared with the projection 23 of the first embodiment so as to tightly engage with the groove 40. That is, the projection of the second embodiment has a height, or a protruding amount, substantially comparable to a total thickness of the side 2*b* of the housing. Thus, the projection of the second embodiment securely engages with the groove 40.

Third Embodiment

Figure 12A:
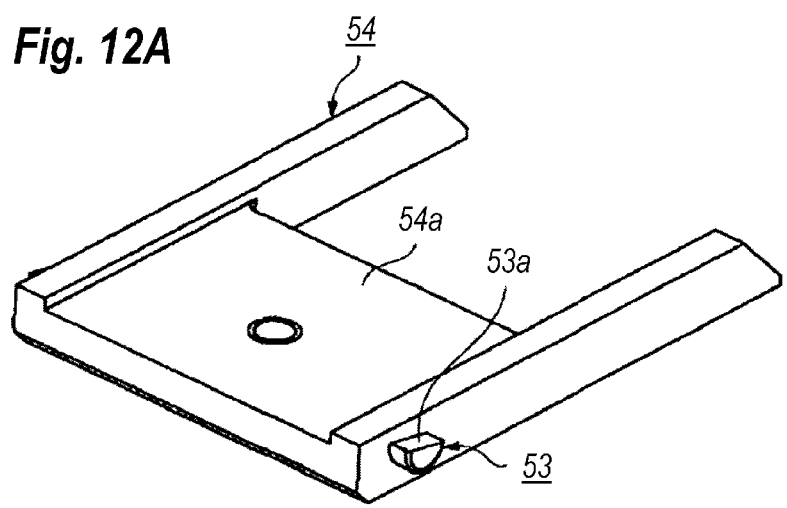
FIGS. 12A and 12B show an inner ceiling and a housing according to the third embodiment of the present invention.
Figure 12B:
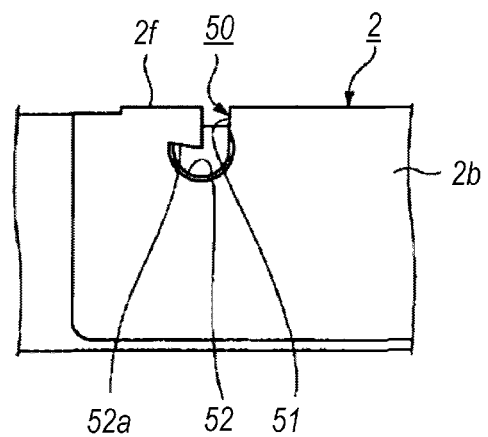

Another optical transceiver according to the third embodiment of the present application will be described as referring to FIGS. 12A and 12B. The optical transceiver of the third embodiment provides another inner ceiling 54 whose outer shape is different from that of the first inner ceiling 4 and the groove 50 of the housing with a shape also different from that 20 of the first embodiment. The inner ceiling 54 of the present embodiment may be made of resin and provides the projection 53 whose shape is different from that 23 of the former projection. The projection 53, although having an outer shape of the semicircular cross section similar to that 23 of the aforementioned embodiment, provides the flat surface 53*a* making a substantial angle against a primary surface 54*a* of the inner ceiling 54. That is, the top wall 52*a* of the second part 52 makes an acute angle against the first part 51, and the projection 53 in the top surface 53*a* thereof is tilted so as to follow the acute angle. The groove 50 provides the first part 51 extending from the top 2*f* of the side 2*b*, which corresponds to the vertical bar of the L-character, and the second part 52 connected to the deep end of the first part 51, which corresponds to the horizontal bar of the L-character. A feature of the groove 50 of the present embodiment is that the second part 52 in the top wall thereof is inclined downward as advancing rearward.

Thus, because the top surface 53*a* of the projection 53 and the top wall 52*a* of the second part 52 of the groove 50 are both inclined, the projection 53 once set within the groove 50 may be further securely engaged to each other compared with those of the aforementioned embodiment. When the inner ceiling 54 is made of resin, the inclined angle of the top surface 53a of the groove 53 may form in moderate compared with the inclined angle of the top wall 52a of the second part 52 of the groove 50. This feature of the top surface 53a and the top wall 52a may generate recovery force due to a twisted projection, which pushes the inner ceiling 54a downward, when the projection 53 engages with the groove 50.

Fourth Embodiment

FIG. 13 is a perspective view showing another inner ceiling 64 and the housing 62. The inner ceiling 64 provides a pair of projections 64a at the front and the rear, respectively, in the sides thereof, while, the housing 62 provides also a pair of openings 62a at the front and the rear, respectively, in the sides thereof, where the projections 64 engages with the openings 62a. A feature of the projections 64a is that the height thereof increases as advancing downward, and another feature of the openings 62a is that the depth thereof becomes shallower as advancing upward, or the thickness of the side 62b in a portion providing the opening 62 becomes thinner as advancing upward. When the inner ceiling 64 is assembled with the housing 62, a top surface of the projection 64a first slides on the inner surface of the side 62b of the housing, the top surface climbs over the side 62b, and the projection 64a engages within the opening 62a.

Thus, the structure of the projection 64a and the opening 62 of the fourth embodiment may securely assemble the inner ceiling 64 with the housing 62 even when the housing 62 and the inner ceiling 64 are made of metal. Also, because the projections 64a and the openings 62a are arranged in the front and the rear, rattling of the inner ceiling 64 may be effectively prevented.

Fifth Embodiment

Figure 14:
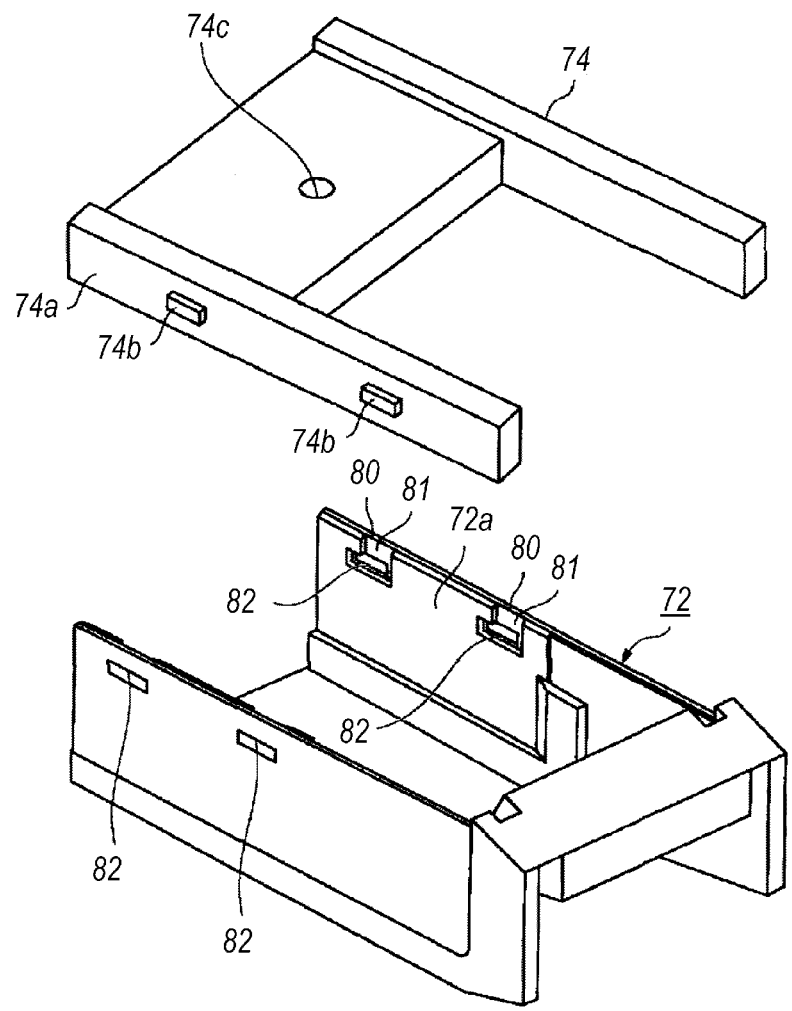
FIG. 14 shows an inner ceiling and a housing according to the fifth embodiment of the present invention.

FIG. 14 is a perspective view showing still another inner ceiling 74 and the housing 72 according to the fifth embodiment of the present application. The housing 72 of the present embodiment provides grooves 80 with a plane shape of the L-character in the inner side 72a thereof. The groove 80 provides the first part 81, which corresponds to the vertical bar of the L-character and the second part 82 corresponding to the horizontal bar of the L-character. The former part 81 forms a hollow, not piercing the side 72a, but the latter part 82 pierces the side 72a. The first and second parts, 81 and 82, have respective rectangular shape.

The inner ceiling 74 of the present embodiment provides sides 74a each having projections 74b with respective rectangular shapes whose outer sizes are substantially equal to the outer shape of the second part 82 of the groove 80 but slightly smaller than those of the second part 82, or the opening in the second part 82. Also, the projections 74b have a horizontal width slightly narrower than a width of the first part 81 of the groove 80. Thus, the projections 74b in the inner ceiling 74 may be engaged with the opening in the second part 82 of the groove 80. Inserting the projections 74b in the first parts 81 of the grooves 80 to the deep end of the first part, then sliding the inner ceiling 74 forward, the projection 74b may engage with the opening in the second part 82 of the groove 80. Thus, the inner ceiling 74 may be securely and rigidly engaged with the housing 72. Thereafter, fastening the screw N with the screw hole 74c passing through the outer ceiling 3 as abutting the projection 74b against the top wall of the second part 82, the outer ceiling 3 may be tightly assembled with the housing 72 through the inner ceiling 74.

Thus, preferable examples of the present invention are described in connection with the drawings. However, the present invention is not restricted to those examples shown in the figures. For instance, some of examples concentrate on the projections in the ceilings with the shape of semicircular, while, other examples provide the projections with the rectangular shape. The present invention is not restricted to those shapes. Circular, elliptic, and/or triangular shape may be applicable as the projection. The projection may have an optional outer shape capable of engaging with the groove, or the opening.

I claim:

1. An optical transceiver, comprising:
    a housing including a bottom and sides each rising from respective edges of the bottom, the sides providing grooves in respective inner surfaces thereof, the housing forming a cavity that encloses optical and electrical components therein;
    an outer ceiling secured with the sides of the housing, the outer ceiling forming the cavity accompanied with the housing; and
    an inner ceiling provided inside of the outer ceiling, the inner ceiling being fit in the housing and providing projections,
    wherein the outer ceiling is fixed to the inner ceiling by a screw, and
    wherein the projections of the inner ceiling are fit in the grooves of the sides of the housing.

2. The optical transceiver of claim 1,
    wherein the grooves each have a plane shape of an L-character including a first part and a second part, the first part corresponding to a vertical bar of the L-character and extending from a top of the side of the housing, the second part corresponding to a horizontal bar of the L-character and having an upper wall,
    wherein the second part has an opening that pierces the side of the housing.

3. The optical transceiver of claim 2,
    wherein the projection of the inner ceiling has a semicircular circular cross section including an arched surface and a flat surface, and
    wherein the opening in the side of the housing has a semicircular cross section fit with the semicircular cross section of the projection.

4. The optical transceiver of claim 3,
    wherein the grooves in the first part thereof each have a width slightly larger than a radius of the semicircular cross section of the projection but smaller than a diameter of the semicircular cross section of the projection, and
    wherein the grooves in the second part thereof each leave a top wall that is in contact with the flat surface of the projection.

5. The optical transceiver of claim 4,
    wherein the flat surface of the projection and the top wall of the semicircular opening in the groove extend parallel to the bottom of the housing.

6. The optical transceiver of claim 4,
    wherein the top wall of the semicircular opening in each of the grooves makes an acute angle against the first part of the grooves.

7. The optical transceiver of claim 2,
    wherein the first part of each of the grooves does not pierce the sides of the housing.

8. The optical transceiver of claim 7,
    wherein the first part of each of the grooves has a depth gradually shallower from the top of each of the sides.

9. The optical transceiver of claim 2, wherein the first part of each of the grooves pierces each of the sides of the housing.

10. The optical transceiver of claim 1, wherein the outer ceiling provides a hole through which the screw passes and the inner ceiling provides a screw hole that receives the screw, and wherein the housing has a box shape with a longitudinal axis, the outer ceiling being secured with the housing at one of ends of the housing along the longitudinal axis thereof, the inner ceiling being fit in the housing at a side opposite to the one of the ends with respect to the screw hole.

11. The optical transceiver of claim 10, wherein the housing in the sides thereof provides pockets in a side opposite to the one of the ends of the housing at which the outer ceiling is secured, and wherein the outer ceiling provides legs in the side opposite to the one of the ends, the pocket in the sides of the housing receiving the legs.

12. The optical transceiver of claim 11, wherein the pockets in the sides of the housing provide projections therein, and the legs in the outer ceiling provide openings that receive the projections in the pockets.

13. An optical transceiver, comprising:

a housing including a bottom and two sides each built from respective edges of the bottom, the housing forming a cavity that encloses optical and electrical components therein;

an outer ceiling secured in one end thereof with the sides of the housing, the outer ceiling forming the cavity accompanied with the housing, the outer ceiling providing a hole;

an inner ceiling provided inside of the outer ceiling and being secured in one end thereof with the sides of the housing, the inner ceiling providing a screw hole; and a screw that passes the hole in the outer ceiling and being received in the screw hole of the inner ceiling, wherein the one end of the outer ceiling and the one end of the inner ceiling each secured with the sides of the housing sandwich the screw received in the screw hole in the inner ceiling.

14. The optical transceiver of claim 13, wherein the outer ceiling further provides legs in a side opposite to the one of the ends, and wherein the sides in the housing provides pockets that receive the legs of the outer ceiling.

15. The optical transceiver of claim 14, wherein the pockets in the sides of the housing provide projections therein, and wherein the legs of the outer ceiling provide openings that receive the projections in the pockets.

* * * * *